Figure 1:
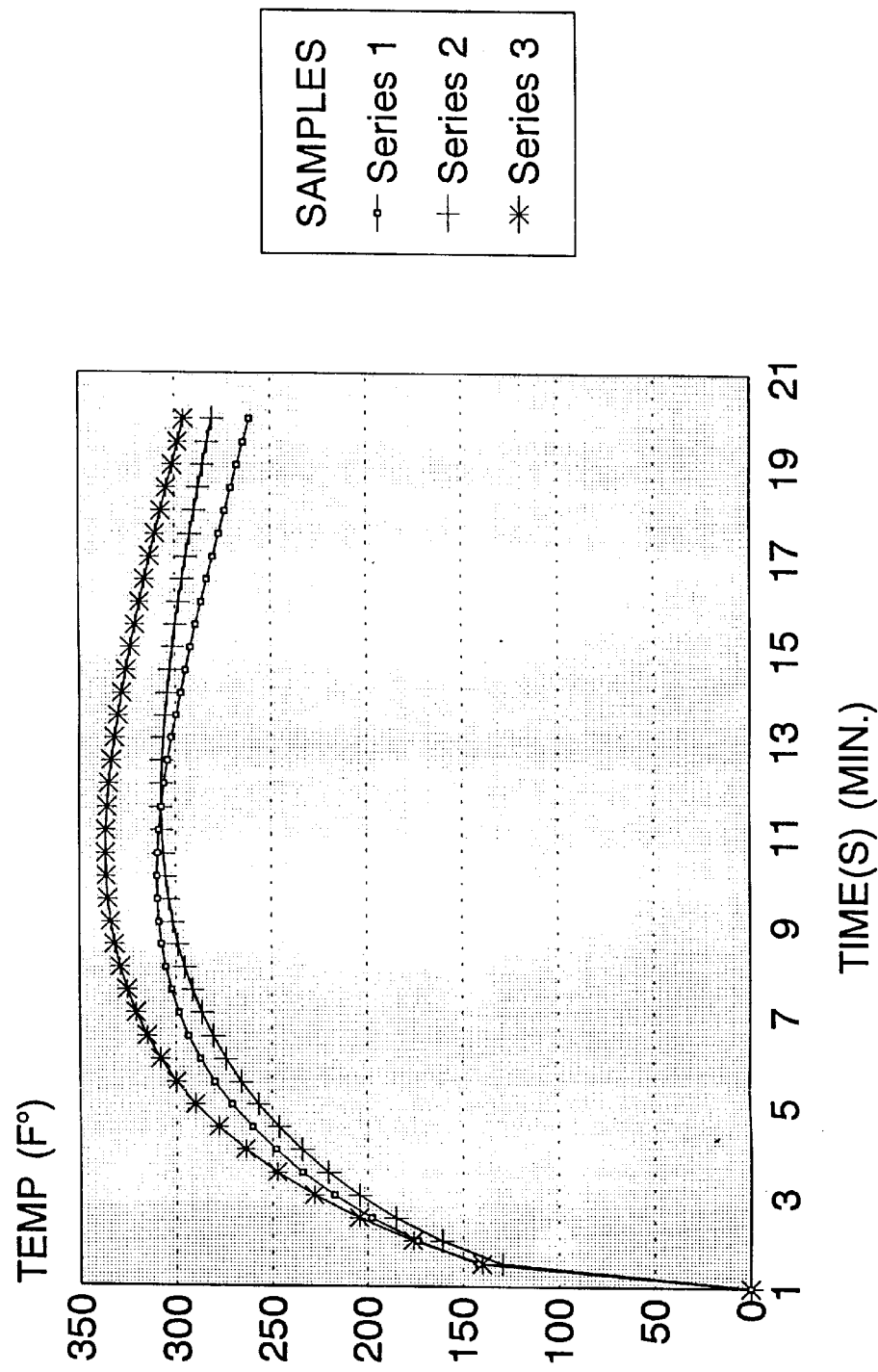

United States Patent [19]
Lee et al.

[11] Patent Number: 5,770,635
[45] Date of Patent: *Jun. 23, 1998

[54] POLYOL COMPOSITION HAVING GOOD FLOW AND FORMIC ACID BLOWN RIGID POLYURETHANE FOAMS MADE THEREBY HAVING GOOD DIMENSIONAL STABILITY

[75] Inventors: Thomas B. Lee, Southgate; Thomas L. Fishback, Gibraltar; Curtis J. Reichel, Southgate, all of Mich.

[73] Assignee: BASF Corporation, Mt. Olive, N.J.

[ * ] Notice: The term of this patent shall not extend beyond the expiration date of Pat. No. 5,686,500.

[21] Appl. No.: 506,797

[22] Filed: Dec. 15, 1995

Related U.S. Application Data

[62] Division of Ser. No. 125,464, Sep. 22, 1993, Pat. No. 5,478,794.

[51] Int. Cl.⁶ .................. C08J 9/08; C08J 9/04; C08G 18/48; C08G 18/18
[52] U.S. Cl. .................. 521/129; 521/115; 521/116; 521/118; 521/128; 521/130; 521/155; 521/174; 521/176
[58] Field of Search .................. 521/115, 116, 521/118, 128, 129, 130, 155, 174, 176

[56] References Cited

U.S. PATENT DOCUMENTS

| | | | |
|---|---|---|---|
| Re. 33,609 | 6/1991 | Nodelman | 521/174 |
| 2,932,621 | 4/1960 | Terry | 521/118 |
| 3,087,900 | 4/1963 | Brown | 521/117 |
| 3,489,698 | 1/1970 | Morehouse | 521/174 |
| 3,509,077 | 4/1970 | Shultz | 521/174 |
| 4,331,778 | 5/1982 | Sommerfeld et al. | 521/129 |
| 4,417,002 | 11/1983 | Liessem | 521/128 |
| 4,450,246 | 5/1984 | Jachimowicz | 521/129 |
| 4,456,696 | 6/1984 | Arbir et al. | 502/167 |
| 4,467,089 | 8/1984 | Bechara | 544/351 |
| 4,473,666 | 9/1984 | Casati et al. | 521/115 |
| 4,510,269 | 4/1985 | Kopp et al. | 521/166 |
| 4,525,491 | 6/1985 | Narisawa et al. | 521/174 |
| 4,582,861 | 4/1986 | Galla et al. | 521/118 |
| 4,617,286 | 10/1986 | Arai et al. | 502/167 |
| 4,707,501 | 11/1987 | Petrella et al. | 521/129 |
| 4,742,089 | 5/1988 | Naka et al. | 521/110 |
| 4,767,736 | 8/1988 | Petrella et al. | 521/129 |
| 4,792,576 | 12/1988 | Nodelman | 521/174 |
| 4,876,019 | 10/1989 | Meyer et al. | 252/32.5 |
| 4,923,904 | 5/1990 | Hasegawa et al. | 521/174 |
| 4,929,646 | 5/1990 | Nichols et al. | 521/174 |
| 4,997,858 | 3/1991 | Jourquin et al. | 521/130 |
| 5,025,039 | 6/1991 | Neuhaus et al. | 521/51 |
| 5,034,425 | 7/1991 | Kuroishi et al. | 521/131 |
| 5,063,253 | 11/1991 | Gansen et al. | 521/174 |
| 5,128,381 | 7/1992 | Tane et al. | 521/174 |
| 5,130,346 | 7/1992 | Ishii et al. | 521/163 |
| 5,155,142 | 10/1992 | Lidy | 521/157 |
| 5,194,175 | 3/1993 | Keske et al. | 521/174 |
| 5,248,703 | 9/1993 | Krueger et al. | 521/125 |
| 5,258,416 | 11/1993 | Krueger et al. | 521/125 |
| 5,318,997 | 6/1994 | Okada et al. | 521/174 |
| 5,478,494 | 12/1995 | Lee et al. | 252/182.25 |
| 5,686,502 | 11/1997 | Murray et al. | 521/174 |

FOREIGN PATENT DOCUMENTS

| | | |
|---|---|---|
| 2003911 | 6/1990 | Canada . |
| 0567027 | 10/1993 | European Pat. Off. . |
| 46-7118 | 2/1971 | Japan . |
| 3-64312 | 3/1991 | Japan . |
| 4-126732 | 4/1992 | Japan . |
| 1072134 | 6/1969 | United Kingdom . |
| 2237025A | 4/1991 | United Kingdom . |

*Primary Examiner*—Rabon Sergent
*Attorney, Agent, or Firm*—Fernando A. Borrego

[57] ABSTRACT

A polyol composition is provided which when reacted with an organic isocyanate, has good flow characteristics and makes a rigid polyurethane foam having good dimensional stability at low densities. The polyol composition has a polyol component which must have present a polyoxyalkylene polyether polyol having an equivalent weight of 130 or less and a hydroxyl number of 400 or more, a polyoxyalkylene polyether polyol having an average functionality from 1.5 to 3.1 and a viscosity of less than 800 cP at 25° C., and a polyoxyalkylene polyether polyol having an average functionality of greater than 3.1 and a viscosity of 5,000 cp or less at 25° C. The polyol composition also has formic acid or a mixture of formic acid and water as blowing agents, and further contains a delayed action blow catalyst and a delayed action gel catalyst.

19 Claims, 1 Drawing Sheet

POLYOL COMPOSITION HAVING GOOD FLOW AND FORMIC ACID BLOWN RIGID POLYURETHANE FOAMS MADE THEREBY HAVING GOOD DIMENSIONAL STABILITY

This is a division of application Ser. No. 08/125,464 filed Sep. 22, 1993, now U.S. Pat. No. 5,478,494.

1. FIELD OF THE INVENTION

The invention relates to a polyol composition comprised of: polyols having certain equivalent weights, functionalities, and viscosities; formic acid or mixtures of formic acid and water as blowing agents; a time delayed blow catalyst; and a time delayed gel catalyst. The polyol composition, when mixed with the isocyanate compound, exhibits improved flow characteristics and reacts to form a dimensionally stable rigid polyurethane foam at low densities.

2. BACKGROUND OF THE INVENTION

In a move to reduce or eliminate ozone-depleting blowing agents from the manufacture of polyurethane foams, much effort has gone into investigating the use of water as a chemically active blowing agent. In situations where one desires a reaction mixture of the isocyanate and polyol composition to flow across a mold surface or throughout a cavity before the onset of a hard gel using water as a blowing agent has been found problematic. The isocyanate reaction with water rapidly develops a high exothermic heat which causes the isocyanate-polyol reaction to quickly form polyurethane linkages, with the attendant disadvantage that the reaction mixture prematurely gels before it can flow throughout the mold. As a result, water-blown rigid polyurethane foams made in a mold or a pour behind application generally exhibit voids and bubbles where the reaction mixture could not flow. This problem is further exacerbated when one desires to make a low density rigid foam because more water must be added to lower the foam density, thereby further increasing the heat of the exotherm.

Low density rigid foams have an increased tendency toward shrinkage. To avoid this problem, crosslinking agents and/or highly functional low molecular weight polyols are added to increase the crosslinking density, thereby improving the foam strength and reducing shrinkage. By adding crosslinking agents and/or highly functionalized low molecular weight polyols to a polyol composition, the flow characteristics of the reaction mixture suffer because the viscosity of the system is increased and more active hydrogen sites are available for reaction with the isocyanate to form a stiffer gel even more quickly.

Polyol compositions generally have fast acting catalysts to speed up the isocyanate-polyol reaction. In an all water-blown system, however, the fast acting catalysts also contribute to the poor flow of the reaction mixture by hastening the formation of a gel. Using merely a slower acting polyurethane promoting catalyst in an all water-blown system does not alleviate the formation of voids because the isocyanate-water reaction by itself is hot enough to form a gel front and inhibit the flow of the unreacted reaction mixture behind the gel front.

It is known that formic acid can be employed in mixture with water as a blowing agent in the manufacture of polyurethane foams with the attendant advantage of lowering the foam exotherm to reduce the risk of scorch and fire, as described in Liessem U.S. Pat. No. 4,417,002. The rigid foams disclosed in this reference, however, are made with a catalyst having an active hydrogen or only with gelation catalysts, made with a polyol known to be of high viscosity, the foams are high density, and/or only one polyol is suggested for use which, according to the present invention, is not capable of simultaneously satisfying all the criteria necessary for good flow while retaining dimensional stability at low densities.

Other publications, such as JP 04126732 and J71007118-B, also disclose that formic acid may be used as a blowing agent, but none teach an advantageous combination of polyols to enhance flow and provide the requisite dimensional stability; nor do any disclose a catalyst combination or the type of combinations needed to ensure proper flow of the reaction mixture. Likewise, JP 03064312 discloses using formic acid as a blowing agent along with a polyol or polyols satisfying certain criteria to solve different problems associated with the initial reactivity of the reaction mixture while maintaining insulation properties. However, the polyol combination required in the instant invention as a means to improve flow and maintain dimensional stability is not addressed or disclosed, nor is the catalyst combination, designed to work with the polyol component of the instant invention, taught by this reference.

3. SUMMARY OF THE INVENTION

It is an object of the invention to make a liquid polyurethane foaming system which exhibits enhanced flow. It is a further object of the invention to make a rigid polyurethane foam which is dimensionally stable at low densities.

We have found that the flow characteristics of a liquid polyurethane foaming system for the manufacture of rigid polyurethane foams are vastly improved when a specific polyol component is employed to react with an organic aromatic polyisocyanate in the presence of blowing agents. We have also found that the specific polyol component in combination with formic acid or a mixture of formic acid and water and certain catalysts further improves the flow characteristics of the foaming polyurethane system. This polyol component, along with the formic acid containing blowing agent and certain catalysts, advantageously permits one to control the reaction profile such that prior to the onset of a high exotherm and a firm gel, the liquid polyurethane foamable system maintains a sufficiently low viscosity enabling, with the aid of the blowing action of at least one of the blowing agents present, to exhibit enhanced flow characteristics. An unexpected advantage of the polyol composition/blowing agent package is that the rigid foams produced therefrom possess excellent dimensional stability at low densities. Further advantages of the invention include more efficient blowing action which, in turn, reduces the amount of isocyanate and blowing agent needed to produce a foam of equivalent density to an all water-blown or a physically active blown polyurethane foam.

4. BRIEF DESCRIPTION OF THE DRAWING

FIG. 1 is a graphical comparison of the heat generated by an all water-blown polyurethane reaction with the heat generated by a formic acid/water blown polyurethane reaction.

5. DETAILED DESCRIPTION OF THE INVENTION

The Polyol Composition

In one inventive feature, a polyol composition has been developed which exhibits good flow characteristics in a reaction with an organic isocyanate and in the presence of blowing agents. The polyol composition comprises a polyol component. In the polyol component there must be present:

a) a polyoxyalkylene polyether polyol having a low equivalent weight at or below 130, a average functionality of 3.1 or greater, to crosslink the polyurethane chains and promote dimensional stability;

b) a polyoxyalkylene polyether polyol having an average functionality in the range from 1.5 to less than 3.1 and a viscosity at or below 800 cP at 25° C. to reduce the viscosity of the composition and reduce the friability of the foam; and, c) a polyoxyalkylene polyether polyol having an average functionality greater than 3.1 and an equivalent weight of greater than 130.

The first criterion (a) requires the use of a polyol having an equivalent weight of 130 or less, preferably 120 or less, most preferably 115 or less, with OH numbers of 431 or higher, preferably 450 or more, most preferably 480 or more, and an average functionality of greater than 3.1, preferably 4 or more, most preferably 4.5 or more. Employing a polyol having an OH and an equivalent weight within these ranges is necessary to impart structural integrity to the foam through crosslinking and to prevent foam collapse. A polyol having an equivalent weight greater than 130 will polymerize with isocyanate to form a chain segment tending to be too flexible, and a polyol having an OH number less than 431 possesses insufficient reactive sites relative to the molecular weight of the polyol to promote a suitable crosslinking density. The structural strength of the foam becomes a major consideration in the manufacture of low density foams which tend to collapse or shrink under aging conditions.

Many polyols satisfying criterion (a) possess high viscosities due to their high hydroxyl numbers and low equivalent weights. A polyol composition with high viscosities will have great difficulty flowing throughout a mold before the polyol-isocyanate reaction mixture gels. Once the urethane gels to form a hard matrix, the reaction mixture behind the gel front proceeds forward only with great difficulty or is substantially prevented from flowing across the gel front to fill the remaining portions of the mold. As the blowing agent gases are released from the reaction mixture trapped behind the hard gel, a localized pressure build-up forms in this area creating large, uneven cell structures or voids in the foam.

The flow characteristics of the reaction mixture in this invention are improved through a physical modification to the viscosity of the polyol component; and further improved through formulating the composition to contain certain blowing agents and catalysts, which is chemical modification to the polyol composition. The physical modification to the viscosity of the polyol component is accomplished by adding a polyoxyalkylene polyether polyol having a viscosity of 800 cP or less, preferably 550 cP or less, at 25° C. to the polyol component, thereby improving the flow of the polyol component, the polyol composition, and the reaction mixture of the polyol composition and the isocyanate. Such a polyol preferably has a low average functionality ranging from 1.8 to less than 3.1, but preferably ranges from 1.9 to 2.1. These low functional polyols of low viscosity also greatly contribute toward reducing the surface friability of the low density foam. The equivalent weight of such a polyol is not limited so long as the viscosity of the polyol is 800 cP or less. In general, the low viscosity polyols used in the invention have equivalent weights ranging from about 80 to 1500, with preferred ranges from greater than 130 to 750.

The polyol satisfying criterion (c) is a bulk polyol suitable in the manufacture of rigid polyurethane foams having an average functionality greater than 3.1 for strength through crosslinking, preferably 3.5 or greater, most preferably 3.9 or greater. This polyol also has an equivalent weight of greater than 130, preferably 140 or more so that while it contributes to the strength of the foam through crosslinking, it is believed, without being bound to a theory, that the longer molecular chains per functional group provide a proper balance between the number of hard and soft segments formed in the polymer matrix and prevent the foam from becoming too tight. While not critical, it is desired that the polyol used has a viscosity of about 10,000 cP or less, preferably about 5000 cP or less, most preferably about 3000 cP or less, at 25° C. to further assist in reducing the viscosity of the polyol composition.

One of the features of the invention lies in a polyol composition having a low viscosity to promote good flow of the reaction mixture, acheived in large through use of the polyol component described above. We have acheived polyol composition viscosities of 2,000 cPs or less, with 1500 cPs or less being more preferred, and 1000 cPs or less being most preferred, at 25 C.

Optimal amounts of polyols used in the polyol component are determined by a polyol reaction mixture exhibiting good flow through use of a low viscosity polyol(s), along with sufficient crosslinker polyol(s) to render the low density foam stable, and balanced with bulk polyol(s) to prevent the foam from becoming friable through an otherwise excessive amount of the crosslinker polyol while maintaining structural integrity. In one non-limiting embodiment of the invention, the amount of bulk polyol c) ranges from 20 weight percent to 75 weight percent, preferably 20 weight percent to 40 weight percent, the amount of crosslinking polyol a) ranges from 10 weight percent to 50 weight percent, preferably 20 weight percent to 40 weight percent, and the amount of low viscosity polyol ranges from 20 weight percent to 60 weight percent, preferably 25 weight percent to 45 weight percent, based on the weight of all polyols used in the polyol component. Furthermore, it is also preferred that the total amount by weight of low viscosity polyol(s) (b) is greater than or equal to the total amount by weight of crosslinking polyol(s) (a) as it is believed that optimal flow characteristics and foam stablility can be attained by this ratio.

Suitable polyols used in the polyol component are the polyoxyalkylene polyether polyols, which is meant herein to include conventional polyoxyalkylene polyether polyols, as well as the polymer modified polyoxyalkylene polyether polyols. Polyester polyols and polyether polyester polyols may advantageously be admixed with the polyether polyols to promote improved adhesion of the foam to substrates, so long as the criteria a)–c) with respect to the polyoxyalkylene polyether polyols are satisfied. Since one of the advantages of the polyol composition of the invention lies in its low viscosity, it is preferred that the amount of polyester based polyols admixed not raise the viscosity of the polyol composition beyond about 2,000 cPs at 25 C.

Suitable polyester polyols include those obtained, for example, from polycarboxylic acids and polyhydric alcohols. A suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, therphthalic acid, phthalic acid, hemimellitic acid, and 1,4-cyclohexanedicarboxylic acid, A suitable polyhydric alcohol may be used such as ethylene glycol propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, IZ6-hexanetriol, α-methyl glucoside, sucrose, and sorbitol. Also included within the term "polyhydric alcohol" are compounds derived from phenol such as 2,2-bis(4-hydroxyphenyl)-propane, commonly known as Bisphenol A.

Those which satisfy criteria (a)–(c) are polyoxyalkylene polyether polyols which are the polymerization products of alkylene oxides with polyhydric alcohols. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide.

The alkylene oxides may be added to the initiator, individually, sequentially one after the other to form blocks, or in mixture to form a heteric polyether. The polyalkylene polyether polyols may have either primary or secondary hydroxy groups. It is preferred that at least one of the polyols, more preferably all of the polyols which satisfy criteria a)–c) are polyether polyols terminated with a secondary hydroxyl group through addition of, for example, propylene oxide, and moste preferably containing solely polyoxypropylene groups. Suitable polyols also include, however, those terminated with ethylene oxide in the amount from 1 to 30 weight percent. Included among the polyether polyols are polyoxyethylene glycol polyoxypropylene glycol, polyoxybutylene glycol, polytetramethylene glycol block copolymers, for example combinations of polyoxypropylene and polyoxyethylene poly-1,2-oxybutylene and polyoxyethylene polyols, poly-1,4-tetramethylene and polyoxyethylene polyols, and copolymer polyols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Suitable initiator molecules include those disclosed above for the preparation of the polyester polyols. Other initiators include aromatic amines such as aniline, N-alkylphenylenediamines, 2,4'-, 2,2'-, and 4,4'-methylenedianiline, 2,6- or 2,4-toluenediamine, vicinal toluenediamines, o-chloroaniline, p-aminoaniline, 1,5-diaminonaphthalene, methylene dianiline, the various condensation products of aniline and formaldehyde, and the isomeric diaminotoluenes; and aliphatic amines such as mono-, di, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine.

Preferable polyhydric alcohols include trimethylolpropane, glycerine, sucrose, sorbitol, propylene glycol, dipropylene glycol, pentaerythritol, and 2,2-bis(4-hydroxyphenyl)-propane and blends thereof. The polyols satisfying component b) are preferably initiated with dihydric alcohols, and further oxyalkylated solely with propylene oxide.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether polyol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction produce of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butane-1,4-dithiol; and alkene thiols such as 3-hexene-1,6-dithiol.

Also suitable as the polyols (a)–(c) are polymer modified polyols, in particular, the so-called graft polyols. Graft polyols are well known to the art and are prepared by the in situ polymerization of one or more vinyl monomers, preferably acrylonitrile and styrene, in the presence of a polyether polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols are also suitable, for example, as those prepared by the reaction of a polyisocyanate with an alkanolamine in the presence of a polyether polyol as taught by U.S. Pat. Nos. 4,293,470; 4,296,213; and 4,374;209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

The polyol composition further comprises a blowing agent comprising formic acid or a mixture of formic acid and water.

The blowing agent employed in the manufacture of the low density rigid polyurethane foams herein comprises at least formic acid. Formic acid upon contact with an isocyanate group reacts to initially liberate carbon monoxide and further decomposes to form an amine with a release of carbon dioxide. Aside from its zero ozone depletion potential, a further advantage of using formic acid is that two moles of gas are released for every mole of formic acid present, whereas a water-isocyanate reaction results in the release of only one mole of gas per mole of water. In both water-isocyanate and formic acid-isocyanate reactions, the isocyanate is consumed and one must add a proportionate excess of isocyanate to compensate for the loss. However, since formic acid is a more efficient blowing agent than water, the moles of formic acid necessary to produce the same moles of gas as a water-isocyanate reaction is greatly reduced, thereby reducing the amount of excess isocyanate and leading to a substantial economic advantage. The amount of isocyanate needed to make an equivalent density foam is 5 to 30 weight percent less when one employs formic acid or mixtures thereof over an all water-blown formulation.

A further advantage of using formic acid in the polyol composition of the invention is its contribution of the improved flowability of the reaction mixture. Without being bound to a theory, it is believed that the formic acid-isocyanate reaction proceeds in the following two-step reaction:

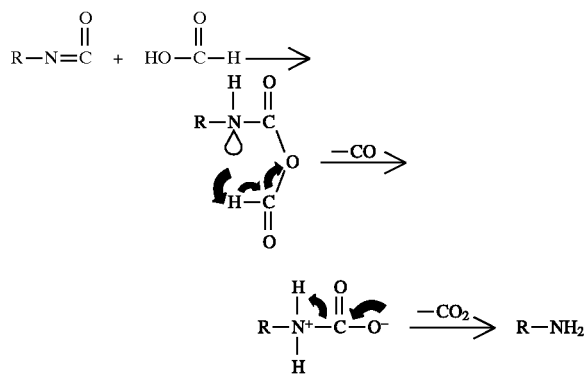

It is believed that liberation of carbon monoxide and subsequently carbon dioxide in the above reaction proceeds at a slower rate than the release of carbon dioxide in a water-isocyanate reaction for two reasons: a) the anhydride is more stable than the carbamic acid formed in a water-isocyanate reaction and, therefore, requires more thermal energy to decompose, and b) the above reaction is a two step reaction rather than a one step reaction present in a water-isocyanate reaction. We have observed that the reaction exotherm in a polyol composition containing formic acid proceeds in a more controlled manner than in an all water blown reaction. A comparison of the curves in FIG. 1 corresponding to Series 1 and 2 (formulations are set forth in working Example III) containing formic acid and water with Series 3 containing only water as the blowing agent indicates that the peak heat of reaction in a formic acid-isocyanate reaction is less than that of an all water blown reaction; and further that the heat of reaction at any given point in time is less heat of reaction at the same point in time in an all water blown reaction. The lower reaction temperatures at any give point in time in the formic acid containing polyol composition of the invention confirms that formic acid leads to a more controlled exotherm.

Measurements taken during the foaming reaction indicates that the gel time and tack free time in the formic acid containing polyol composition of the invention is longer than the gel and tack free time in an all water blown system. Lower exotherms, especially at the onset of the reaction, are significant because the energy driving the reaction between the isocyanate and polyols is lowered, thereby enhancing flow and avoiding a rapid gel front buildup. In an all water blown system, the reaction between the isocyanate and water proceeds quickly and raises the exotherm earlier, thereby promoting a quicker urethane matrix formation as evidenced by the faster gel time. By contrast, the polyurethane matrix formation from the cream to the gel time in the formic acid containing polyol composition of the invention does not proceed as quickly due to the lower exotherm at an equivalent point in time. The lower exotherm and longer gel times are another factor in the invention which allow the reactive mixture to flow further without encountering the fast setting urethane matrix in the hotter all water systems.

The formic acid/formate ions in the polyol composition may be supplied by addition of formic acid or a mixture of formic acid and soluble salts of formic acid. Suitable salts of formic acid include the amine or ammonium salts of weakly base mono, di, or trialkylamines, including hydrazine, triethylamine, dimethylbenzylamine, and triethylenediamine. Many of these tertiary amine salts of formic acid act in a dual capacity as a source of formate ions for gas production and as a catalyst for the reaction between isocyanate and compounds having isocyanate reactive hydrogens. Therefore, it is possible to add solely tertiary amine salts of formic acid or any other catalytically active salt of formic acid as the sole source of blowing agent. In this situation, however, the amount of tertiary amine salts of formic acid added to the polyol composition is limited by the maximum amount of catalyst the system can bear, meaning that if one is relying solely upon the formate ions present in the tertiary amine salt of formic acid as the source of blowing agent, only a high density foam can be made as between 2 to 20 pcf. If the tertiary amine salts of formic acid are added in quantities necessary to provide the sole source of gas for the manufacture of a low density foam under 2 pcf while having the improved flow characteristics described herein, the corresponding tertiary amine cations acting as catalysts in the solution would also be present in such large quantities that the reaction mixture would be over catalyzed. Since many of the advantageous features of the invention lie in overcoming the problems associated with low density foams, it is preferred that the formate ions present in the polyol composition are supplied by the addition of formic acid or a mixture of formic acid and a salt of formic acid, rather than solely as catalytically active tertiary amine salt; and it is further preferred that the number of formate ion equivalents present in the polyol composition from formic acid or a mixture of formic acid and salts of formic acid exceed the combined number of catalytically active cationic salt equivalents and, if present, other catalytically active tertiary amine equivalents including fully substituted amine initiated polyoxyalkylene polyether polyols which can react in situ with formic acid.

Formic acid does not corrode injection or mixing equipment. The reason for the lack of corrosion is not clear, but it is believed that such factors as the fact that formic acid is strong reducing agent, the presence of bases such a KOH catalysts used in the manufacture of polyols acting as buffers, and the possibility of the formation of a passivation film each individually or in combination contribute towards preventing corrosion. Suitable concentrations of formic acid are any commercially available, ranging from about 90% pure to 100% pure, with the major impurities being water and in some cases acetic acid depending upon the source.

To the polyol composition may be added formic acid or a mixture of formic acid and salts of formic acid as the sole blowing agent, or one may add a combination of blowing agents comprising formic acid (and mixture thereof with its salts) and a reactive and/or physically active blowing agent. Examples of reactive blowing agents used in the formic acid containing polyol composition are water, tertiary alcohols, other 2 to 20 carbon atom mono or poly carboxylic acids having molecular weights from 70 to 600 and their amine or ammonium salts. Preferably, water is used as the additional blowing agent in the polyol composition.

Physically active blowing agents contemplated as suitable additives in the polyol composition comprise alkanes having 4 to 12 carbon atoms, preferable 5 or 6 carbon atoms, such as n-pentane, isopentane, or n-hexane; cycloalkanes having 4 to 6 carbon atoms preferable 5 or 6 carbon atoms, such as cyclopentane; linear or cyclic, saturate or olefinically unsaturated ethers having 2 to 5 carbon toms, such as dimethylether, diethylether, methylethylether, vinyl methyl or ethyl ether, divinyl ether, and THF; aliphatic carboxylic acid esters having a maximum boiling point of 142° C., preferably below 80° C., such as 1–4 carbon acetates and methyl or ethyl formate; aliphatic and/or cycloaliphatic ketones having 3 to 5 carbon atoms, such as acetone, methyl ethyl ketone, and cyclopentane; partially halogenated chlorofluorocarbons having 1 or 2 carbon atoms, such as R22, R123, R141b; perfluorinated, linear or cyclic ethers having 4 to 12 carbon atoms, preferably 4 to 6 carbon atoms, such as perfluorodineopyl or ether or perfluoroethyl propyl ether; and preferably fluorinated or perfluorinated, advantageously aliphatic or cycloaliphatic hydrocarbons having 3 to 8 carbon atoms, preference being given to aliphatic or cycloaliphatic, fluorinated hydrocarbons having 3 to 6 carbon atoms which are liquid at room temperature and contain at least one bonded hydrogen atom and aliphatic or cycloaliphatic, perfluorinated hydrocarbons having 4 to 7 carbon atoms.

It is preferred, however, that solely chemically active blowing agents are used in the polyol compositions, and more preferable is a combination of formic acid and water, although formic acid may also be employed as the sole blowing agent.

The amount of blowing agent used is dependent upon the desired density of the rigid polyurethane foam. The foam densities may range from 1.0 p.c.f. to 4.0 p.c.f taken from the core of either a free rise rigid polyurethane foam or a packed (molded) rigid polyurethane foam. However, a noteworthy advantage of the polyol composition containing formic acid is the ability to make low density rigid polyurethane foams which are dimensionally stable, whether open celled or closed celled. Therefore, the preferred core foam densities range from 1.0 p.c.f. to 1.8 p.c.f., more preferably from 1.1 to 1.6 pcf, most preferably from 1.1 to 1.5 pcf. The preferred overall densities of foams packed to 10% by weight, meaning the percentage by weight of foam ingredients above the theoretical amount needed to fill the volume of the mold upon foaming, are from about 1.2 to about 2.0 pcf, more preferrably from 1.3 to 1.6 pcf, with the core densities of these 10% by weight packed foams advantageously being lower than the overall densities by 10% or less, more preferably about 8% or less, most preferably about 6% or less. The closer the value between the overall density and the core density of a foam packed in a mold, the more uniform is the flow of the reaction mixture throughout the mold.

To achieve these densities, suitable amounts of formic acid added in the polyol composition, which by this statement includes the weight of formate ions in salt form if any are added, range from 3.0 to 15.0 parts by weight (p.b.w.) more preferably greater than 5.0 p.b.w. to 10.0 p.b.w., most preferably from 6 p.b.w. to 8 p.b.w., based on 100 p.b.w. of the polyol component. Other blowing agents may also be present, and preferably water is present, but in any event, the amount of formic acid added as such or in mixture with other blowing agents is within the above stated range. The total amount of blowing agent mixtures is limited so long as the above stated amounts of formic acid is added and the foam retains its dimensional stability and flowability.

As stated above, in a more preferable embodiment, the blowing agent comprises a mixture of water and formic acid. By adjusting the ratio of formic acid to water, one may advantageously control the open cell content of the rigid foam. Formic acid tends to close the cells of the foam, while water tends to open up the foams cells. Formic acid to water weight ratios of 1: 0.2–0.5 have been found effective in the manufacture of both open and closed celled rigid polyurethane foams having free rise core densities within the range as low as 1.1 to 1.3 p.c.f., with a weight ratio of 1: 0.4–0.45 being most effective. The phrase "open celled" is construed herein as a foam having an open cell content of greater than 20%, or conversely, a closed celled content of less than 80%, while a "closed celled" foam is one in which the number of open cells, is 20% or less, or conversely the number of closed cells is 80% or greater, the measurement being taken from a molded foam packed at 10% over the theoretical amount required to fill the mold with foam. Suitable amounts of water in a mixture of water and formic acid ranges from 0.5 to 5 pbw based on the weight of the polyol component, preferably from 2 to 4 pbw. When water is present in an amount of 3 p.b.w. or more based on 100 p.b.w. of the polyols, the foam is open celled.

Formic acid is readily soluble in water, alcohols, and ethers, including polyether polyols. It may be added directly to the polyol to form a polyol composition along with catalysts and surfactants, or it may be added at the mixhead of impingement mixing or rotary mixing polyurethane machines.

The polyol composition may be commercially offered as a mixture of the polyol component, blowing agent comprising formic acid or a mixture of formic acid and water, the catalysts discussed below. Alternately, a supplier may offer the polyol component along with a formulation to a molder/producer of foams who may then blend the polyol component with a precursor containing blowing agents and catalysts described below. In another embodiment of the invention, there is provided the combination of the polyol component with a blowing agent comprising formic acid, and more preferably a mixture of formic acid and water, as a package to which the molder/producer may blend the catalysts described below. Other suitable packages which may be made commercially available are a polyols-catalyst combination, polyols-catalyst-surfactant combination, and catalyst-blowing agent combination.

The types of catalyst and their combinations were designed for the preparation of polyurethane foams using the polyols meeting criteria (a)–(c) and formic acid as a blowing agent and preferably a formic acid/water mixture as the blowing agent. As mentioned above, the exotherm developing between a formic acid-isocyanate reaction is not as high as a water-isocyanate reaction. Without the rapid increase in temperature, the polyurethane matrix does not develop and solidify as quick, and consequently, the reaction mixture flows with greater ease than would an all water-isocyanate reaction. Therefore, the catalysts used in the invention advantageously employ a time delay feature and comprise a delayed action blow catalyst and a delayed action gel catalyst. Blow and gel catalysts are desirable to decrease demolding time by accelerating the rate of reaction between the blowing agent (formic acid or a mixture of water and formic acid) and the isocyanate in the case of a blow catalyst and accelerating the reaction between the polyols and isocyanate in the case of the gel catalyst. Using a delayed action feature for the blow catalyst and the gel catalyst allows the reaction mixture to flow across the mold surface with greater ease prior to the onset of the bulk of catalytic activity.

It is not necessary to provide immediate blowing action with the aid of a blow catalyst since the formic acid and isocyanate react sufficiently fast out of the mix-head to propel the liquid reaction mixture along the mold surface. A non-delayed, quick-acting blow catalyst generates a much faster release of gas, which may allow the gases to escape before gelation sets in to trap the gases. This would result in a rapid increase in gas pressure causing damage to the foam cell structure and decreasing adhesion of the foam to a substrate in pour in place applications. It is also not desirable to use a quick acting gel catalyst for the reason that a prematurely formed hard gel front hinders the flow of the liquid system behind the front. By employing the delayed action catalysts, much of the blowing action and gelation occur after the reaction mixture has flowed a great distance, thereby providing a foam having greater uniformity of cell structure, enhanced adhesion, and dimensional stability.

To provide a time delay feature to the catalysts empolyed in the invention, some of the catalysts may be blocked with an organic carboxylic acid. By a "blocked" catalyst compound or tertiary amine compound is meant that the compound may be blocked with an organic carboxylic acid prior to admixture with the polyol component or the compound may be blocked within the polyol component by virtue of mixing an initially unblocked compound with the polyol component along with formic acid effectively resulting in a formic acid blocked compound. By an "unblocked" catalyst or tertiary amine is meant that prior to adding the catalyst compound to the polyol component, it is not blocked with a carboxylic acid because its molecular structure provides the time delay required without the necessity for blocking with an organic carboxylic acid, although it is possible and even probable that blocking to some extent will occur once the unblocked catalyst is added to the polyol composition containing formic acid. In those cases where an organic carboxylic acid is necessary to impart a time delay feature to the catalyst, commercial considerations would lead one to add an unblocked catalyst to the polyol composition containing formic acid since the unblocked catalysts are generally not as expensive.

The delayed action blowing catalysts used in the invention are carboxylic acid blocked tertiary amines, preferably carboxylic acid blocked tertiary amine ethers. These delayed action blowing catalysts are generally thermally activated by the heat of the exotherm. Tertiary amine portions of the delayed action blow catalyst have the general formula:

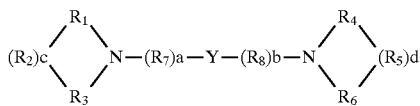

wherein $R_1$, $R_3$, $R_4$, and $R_6$ are each independently branched or preferably unbranched $C_1$–$C_5$ alkyl radicals when the corresponding c or d equals zero, preferably methyl or ethyl radicals, and $R_1$, $R_3$, $R_4$, and $R_6$ are each independently a methylene group when the corresponding c or d is greater than zero;

$R_2$ and $R_5$ are branched or preferably unbranched methylene groups, optimally containing an ether $R_7$ and $R_8$ are each independently branched or unbranched methylene groups;

Y is oxygen, or

preferably oxygen, $R_9$ and $R_{10}$ are each independently a $C_1$–$C_5$ radical; preferably a methyl or an ethyl radical;

a and b are each independently an integer from 1 to 6, preferably 1 to 2;

c and d are each independently an integer from 0 to 6, preferably 0;

e is an integer from 2 to 4; and f is an integer from 1 to 3.

Specific examples of tertiary amine blowing catalysts include one or more of N,N,N,N"-tetramethyl-2,2'-diaminodiethyl ether; N,N,N,'N",N"pentamethyl diethyl triamine; N,N,N',N",N'",N"",N"" hydromethyl tetraethyl pentamine; N,N,N',N",N" pentamethyl dipropylene triamine, 2 dimethyaminoethyl-1,3-dimethylaminopropyl ether; and N,N-dimorpholinoethyl ether.

Suitable organic carboxylic acids used to block the tertiary amine blowing catalyst and delayed action gel catalysts include mono- or dicarboxylic acids having 1–20 carbon atoms, such as formic, acetic, propionic, butyric, caproic, 2-ethyl-hexanoic, caprylic, cyanoacetic, pyruvic, benzoic, oxalic, malonic, succinic, and maleic acids, with formic acid being preferred. The organic acid blocked tertiary amine blowing catalysts are usually dissolved in water or organic solvents to avoid separation of the salt as crystals and the resultant phase separation. Preferable organic solvents include polyols having 2 to 4 hydroxyl groups in the molecule, such as ethylene glycol, diethylene glycol, propylene glycol, dipropylene glycol, butanediols, 2,6-hexanediol and glycerine. Among the cited compounds most frequently used are ethylene glycol, diethylene glycol, propylene glycol, dipropylene glycol and 1,4-butanediol.

The tertiary amine blowing catalysts are blocked completely or partially with an organic carboxylic acid to yield a respective, fully blocked tertiary amine salt of the organic carboxylic acid or a partial salt of the organic carboxylic acid. The amount of organic carboxylic acid reacted with the tertiary amine blowing catalyst depends upon the degree to which one desires to delay the tertiary amine catalytic activity. However, since formic acid blowing agent added to the polyol composition reacts with amine bases, in most cases the tertiary amine blowing catalyst will become fully blocked in the polyol composition even if initially added to the polyol composition as a partially blocked catalyst. Nevertheless, the amount of formic acid added as a blowing agent to the polyol composition may be sufficiently small that the formic acid forms salts with the amine initiated polyols, if present, and may therefore not be available to react with all the tertiary amine catalyst added. In this case, if the tertiary amine is only partially blocked it may remain partially blocked in the polyol composition. It is contemplated, however, that the tertiary amine blowing catalyst will generally be fully blocked within the polyol composition.

The second catalyst provided in the polyol composition or precursor is a delayed action gel catalyst designed to increase the reaction rate between the polyols and isocyanate and promote dimensional stability. Unlike the delayed action blow catalyst which must be blocked with a carboxylic acid to provide its time delay properties, the delayed action gel catalyst may, depending upon the structure, be blocked or unblocked and still provide time delay. In the blowing agent-catalyst precursor, however, both the blow catalyst and the gel catalyst will be fully blocked with an organic acid no matter what the structure of the gel catalyst is since the number of carboxylic acid equivalents present in the precursor will be greater than the number of amine equivalents and there are no other basic entities present such as amine initiated polyether polyols present to ionically bond with the carboxylic acid.

Suitable delayed action gel catalysts are any tertiary amine catalysts known in the polyurethane art to have time delay properties, including alicyclic tertiary amines and aliphatic tertiary amines. Unblocked aliphatic tertiary amines with the following general formula are well adapted for use in the invention as a delayed action gel catalyst:

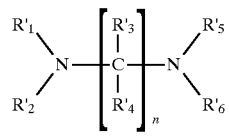

wherein $R_1'$, $R_2'$, $R_5'$, and $R_6'$ are each independently a $C_1$–$C_5$ branched or unbranched alkyl radical, preferably methyl or ethyl radical, optionally substituted with a hydroxyl group. $R_3'$ and $R_4'$ are each independently hydrogen or $C_1$–$C_3$ alkyl radicals, preferably hydrogen; and n is an integer from 4 to 10, preferably 6 to 8.

Examples of unblocked aliphatic gel catalyst are N,N,N',N' tetramethyl hexamethylene diamine and N,N' dimethyl-N,N'-diisopropyl hexamethylenediamine, the former being preferred.

Other tertiary amine gel catalysts which are useful in the invention are the organic acid blocked aliphatic, alicyclic or heterocyclic tertiary amine catalysts known in the art to catalyze the isocyanate-polyol reaction. Some of these tertiary amines having the general formulas:

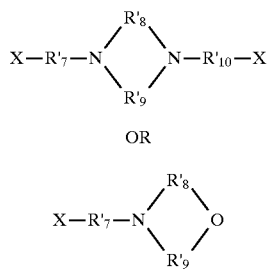

wherein $R_7'$ and $R_{10}'$ are each independently a branched or unbranched $C_1$ to $C_{10}$ methylene groups, preferably $C_1$–$C_3$ methylene groups, or wherein $R_7'$ and $R_{10}'$ may be connected to each other to form a closed ring having 2 to 6 carbon atoms between the nitrogens; and $R_8'$ and $R_9'$ are each independently a branched or unbranched $C_1$ to $C_6$ methylene groups; the bonds across the N or O atoms and the $R_8'$ or $R_9'$ groups are single or double, preferably single; X is hydrogen or

wherein R" and R'" are each independently a branched or unbranched $C_1$ to $C_6$ alkyl radical, preferably a methyl or ethyl radical, and wherein R' and R" may be optionally connected to each other through an oxygen or a substituted tertiary nitrogen to form a closed ring having 2 to 6 carbon atoms.

Suitable organic acid blocked amine gel catalysts are the acid blocked amines of triethylenediamine, N-ethyl or methyl morpholine, N,N dimethylaminoethyl morpholine, N-butylmorpholine, N,N' dimethylpiperazine, bis-(dimethylamino-alkyl)-piperazines, 1,2-dimethyl imidazole. Suitable tertiary amines within the invention which must be blocked with an organic acid are dimethyl benzylamine, tetramethylethylenediamine, and dimethyl cyclohexylamine.

The gel catalyst may be blocked partially or completely preferably completely with the same organic carboxylic acids as the blowing catalyst referred to above, preferably blocked with formic acid. Further, the gel catalyst may be dissolved in the same solvents as used to dissolve the blowing catalyst.

The total amount of blowing catalyst and gel catalyst in the polyol composition is that amount by weight effective to accelerate the reaction between the blowing agent(s)-polyols and the isocyanate. Generally, the total amount of blowing and gel catalysts range from 0.1 to 6.0 pbw, preferably 2.0 to 4.0 pbw, based on 100 pbw or the polyol component.

A cure catalyst is generally employed to shorten tack time and promote green strength, and the use of such a catalyst is prefered and advisable to assist in the prevention of foam shrinkage. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X—R^1—Y]_2$, wherein R is a $C_1$–$C_8$ alkyl or aryl group, $R^1$ is a $C_0$–$C_{18}$ methylene group optionally substituted or branched with a $C_1$–$C_4$ alkyl group, Y is hydrogen or an hydroxyl group, preferably hydrogen, X is methylene, an —S—, an —$SR^2COO$—, —SOOC—, an —$O_3S$—, or an —OOC— group wherein $R^2$ is a $C_1$–$C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8C) tin (IV) salts of inorganic compounds such as butyltin trichloride, dimethyl- and diethyl- and dibutyl- and dioctyl- and diphenyl-tin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20C) tin dimercaptides, including dimethyl-, dibutyl-, and dioctyl-tin dimercaptides.

Suitable amounts of cure catalyst range from 0.01 to 3.0 pbw, preferably from about 0.01 to 1.5 pbw based on 100 pbw of the polyol component, with about 1.0 pbw being all that is needed to provide a dimensionally stable foam. In one embodiment of the invention, there is provided a blowing agent-catalyst precursor which may be commercialized as a concentrate, comprising a tertiary amine blowing catalyst fully blocked with an organic acid, a tertiary amine gel catalyst fully blocked with an organic acid, and a blowing agent comprising formic acid or a mixture thereof wherein the total number of carboxylic acid group equivalents present in the precursor, including the carboxylic acid groups in

form is greater than 1 per amino group, preferably ranging from 1.25, more preferably from 1.5, and most preferably from 2 to 20 carboxylic acid equivalents per amino group. It is preferred that greater than 90 weight percent, more preferably greater than 95 weight percent, most preferably 100 weight percent, of the organic acid in the precursor is formic acid.

The fully blocked blowing and gel catalysts may be blocked with any of the aforementioned organic carboxylic acids or mixtures thereof, but are preferably blocked with formic acid. The precursor may then be proportionately added to the aforementioned polyols to form a polyol composition suitable for reaction with an isocyanate for the manufacture of low density rigid polyurethane foams having good dimensional stability. As mentioned above, it is possible to use as the only source of formic acid the formic acid blocking the tertiary amine blowing and gel catalyst, however, this would require high levels of catalyst yielding only small amounts by weight of formic acid which would adversely impact on the flow characteristics of the foam. Therefore, it is desired that the blowing agent containing catalyst precursor contain an excess of organic acid equivalents per amino group, and preferably in the proportions and levels desired for use in the polyol composition, along with water if a mixture is desired, to avoid further blending.

In another embodiment of the invention, there is also provided a formic acid free polyol composition comprising the aforementioned polyols along with an unblocked tertiary amine blowing catalyst, an unblocked tertiary amine gel catalyst, and other desired additives such as water and a surfactant but devoid of formic acid. Formic acid acting as a blowing agent may then be added to the formic acid free polyol composition at a later time in the desired amounts to form a polyol composition ready for foam preparation. The added formic acid will react in situ with any amines present in the polyol composition, including the tertiary amine blowing and gel catalysts to form formic acid fully or partially, preferably fully blocked tertiary amine blowing and gel catalysts in the polyol composition.

Other suitable catalysts may optionally be employed in addition to the blocked blowing and gel tertiary amine catalysts mentioned above. For example, tin catalysts may be used to shorten tack time and promote green strength. Suitable organotin tin catalysts are tin (II) salts of organic carboxylic acids, e.g., tin (II) acetate, tin (II) octanoate, tin (II) ethylhexanoate and tin (II) laurate, and dialkyltin (IV) salts of organic carboxylic acids, e.g., dibutyltin diacetate, dibutyltin diacetate, dibutyltin dilaurate, dibutyltin maleate, and dioctyltin diacetate. Preferred, however, are tin catalysts with tin-sulfur bonds which are resistant to hydrolysis, such as dialkyltin dimercaptides, including dimethyl-, dibutyl-, and dioctyl- tin dimercaptides.

Urethane-containing foams may be prepared with or without the use of chain extenders and/or crosslinking agents (c), which are not necessary in this invention to achieve the desired mechanical hardness and dimensional stability. The chain extenders and/or crosslinking agents used are diols and/or triols having a molecular weight of less than 400, preferably from 60 to 300. Examples are dialkylene glycols and aliphatic, cycloaliphatic and/or araliphatic diols having from 2 to 14 carbon atoms, preferably from 4 to 10 carbon atoms, e.g., ethylene glycol, 1,3-propanediol, 1,10-decanediol, o-, m-, and p-dihydroxycyclohexane, diethylene glycol, dipropylene glycol, and preferably 1,4-butanediol, 1,6-hexanediol, bis(2-hydroxyethyl) hydroquinone, triols such as 1,2,4- and 1,3,5-trihydroxycyclohexane, glycerol, and trimethylolpropane.

Polyurethane foams can also be prepared by using secondary aromatic diamines, primary aromatic diamines, 3,3'-di- and/or 3,3'-, 5,5'-tetraalkyl-substituted diaminodiphenylmethanes as chain extenders or crosslinking agents instead of or mixed with the above-mentioned diols and/or triols. By the term polyurethane foam as used herein is also meant to include polyurethane-polyurea or polyisocyanurate foams.

Examples of secondary aromatic diamines are N,N'-dialkyl-substituted aromatic diamines, which are unsubstituted or substituted on the aromatic radical by alkyl radicals, having 1 to 20, preferably 1 to 4, carbon atoms in the N-alkyl radical, e.g., N,N'-diethyl-, N,N'-di-sec-pentyl-, N,N'-di-sec-hexyl-, N,N'-di-sec-decyl-, and N,N'-dicyclohexyl-p- and m-phenylenediamine, N,N'-dimethyl-, N,N'-diethyl-, N,N'-diisopropyl-, N,N'-di-sec-butyl- and N,N'-dicyclohexyl-4,4'-diaminodiphenylmethane and N,N'-di-sec-butylbenzidine.

If aromatic diamines are used, it is best to use those which have at least one alkyl substituent in the orthoposition to the amino groups, are liquid at room temperature, and are miscible with the polyether polyols. Furthermore, alkyl-substituted meta-phenylenediamines of the formulae:

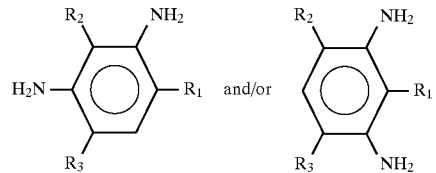

where $R_3$ and $R_2$ are identical or different and are methyl, ethyl, propyl, or isopropyl, and $R_1$ is linear or branched alkyl having 1 to 10 carbon atoms, preferably 4 to 6 carbon atoms, are useful.

Also useful are those alkyl radicals $R_1$ in which the branching point is on the $C_1$ carbon atom. Specific examples of radicals $R_1$ are methyl, ethyl, isopropyl, 1-methyloctyl, 2-ethyloctyl, 1-methylhexyl, 1,1-dimethylpentyl, 1,3,3-trimethylhexyl, 1-ethylpentyl, 2-ethylpentyl, and preferably cyclohexyl, 1-methyl-n-propyl, tert-butyl, 1-ethyl-n-propyl, 1-methyl-n-butyl and 1,1-dimethyl-n-propyl.

Specific examples of radicals $R_1$ are methyl, ethyl, isopropyl, 1-methyloctyl, 2-ethyloctyl, 1-methylhexyl, 1,1-dimethylpentyl, 1,3,3-trimethylhexyl, 1-ethylpentyl,2-ethylpentyl and preferably cyclohexyl, 1-methyl-n-propyl, tert-butyl, 1-ethyl-n-propyl, 1-methyl-n-butyl, and 1,1-dimethyl-n-propyl.

Examples of suitable alkyl-substituted m-phenylenediamines are 2,4-dimethyl-6-cyclohexyl-, 2-cyclohexyl-4,6-diethyl-, 2-cyclohexyl-2,36-isopropyl-, 2,4-dimethyl-6-(1-ethyl-n-propyl)-, 2,4-dimethyl-6-(1,1-dimethyl-n-propyl)- and 2-(1-methyl-n-butyl)4,6-dimethyl-1,3-phenylenediamine. Preference is given to 1-methyl-3,5-diethyl-2,4- and -2,6-phenylenediamines, 2,4-dimethyl-6-tert-butyl-, 2,4-dimethyl-6-isooctyl- and 2,4-dimethyl-6-cyclohexyl-1,3-phenylenediamine.

Examples of suitable 3,3'-di- and 3,3',5,5'-tetra-n- alkyl-substituted 4,4'-diaminodiphenylmethanes are 3,3'-di-, 3,3', 5,5'-tetramethyl', 3,3'-di-, 3,3',5,5'-tetraethyl-, 3,3'-di- and 3,3',5,5'-tetra-n-propyl-4,4'-diaminodiphenylmethane.

Preference is given to diaminodiphenylmethanes of the formula:

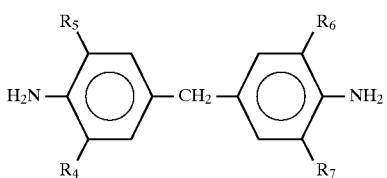

where $R_4$, $R_5$, $R_6$, and $R_7$ are identical or different and are methyl, ethyl, propyl, isopropyl, sec-butyl or tert-butyl, but where at least one of the radicals must be isopropyl or secu-butyl. The 4,4'-diaminodiphenylmethanes may also be used in a mixture with isomers of the formulae:

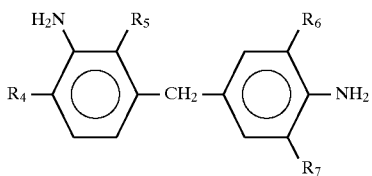

and/or

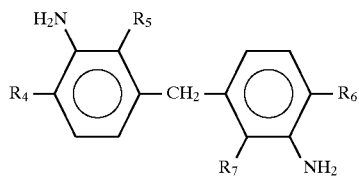

where $R_4$, $R_5$, $R_6$, and $R_7$ are as defined above.

Preference is given to 3,4-dimethyl-3', 5'-diisopropyl- and 3,3',5,5'-tetraisopropyl4,4'-diaminodiphenylmethane. The diaminodiphenylmethanes can be employed individually or in the form of mixtures.

Said chain extenders/crosslinking agents can be used individually or as mixtures of identical or different types of compounds.

The amount of chain extender, crosslinking agent or mixture thereof used, if any, is expediently from 2 to 20 percent by weight, preferably from 1 to 15 percent by weight, based on the weight of the polyols. However, it is preferred that no chain extender/crosslinker is used for the preparation of rigid foams since the polyether polyols described above are sufficient to provide the desired mechanical properties.

If desired, assistants and/or additives (f) can be incorporated into the reaction mixture for the production of the cellular plastics by the polyisocyanate polyaddition process. Specific examples are surfactants, foam stabilizers, cell regulators, fillers, dyes, pigments, flame-proofing agents, hydrolysis-protection agents, and fungistatic and bacteriostatic substances.

Examples of suitable surfactants are compounds which serve to support homogenization of the starting materials and may also regulate the cell structure of the plastics. Specific examples are salts of sulfonic acids, e.g., alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil, and cell regulators, such as paraffins, fatty alcohols, and dimethylpolysiloxanes. The surfactants are usually used in amounts of 0.01 to 5 parts by weight, based on 100 parts by weight of the polyol component.

For the purposes of the invention, fillers are conventional organic and inorganic fillers and reinforcing agents. Specific examples are inorganic fillers, such as silicate minerals, for example, phyllosilicates such as antigorite, serpentine, hornblendes, amphiboles, chrysotile, and talc; metal oxides, such as kaolin, aluminum oxides, titanium oxides and iron oxides; metal salts, such as chalk, baryte and inorganic pigments, such as cadmium sulfide, zinc sulfide and glass, inter alia; kaolin (china clay), aluminum silicate and coprecipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the polyols and the isocyanate); but the content of mats, nonwovens and wovens made from natural and synthetic fibers may reach values of up to 80 percent by weight.

Examples of suitable flameproofing agents are tricresyl phosphate, tris(2-chloroethyl) phosphate, tris(2-chloropropyl) phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 50 parts by weight, preferably from 5 to 25 parts by weight, of said flameproofing agents may be used per 100 parts by weight of the polyols.

Further details on the other conventional assistants and additives mentioned above can be obtained from the specialist literature, for example, from the monograph by J. H. Saunders and K. C. Frisch, High Polymers, Volume XVI, Polyurethanes, Parts 1 and 2, Interscience Publishers 1962 and 1964, respectively, or Kunststoff-Handbuch, Polyurethane, Volume VII, Carl-Hanser-Verlag, Munich, Vienna, 1st and 2nd Editions, 1966 and 1983.

Suitable organic polyisocyanates (a), defined as having 2 or more isocyanate functionalities, are conventional aliphatic, cycloaliphatic, araliphatic and preferably aromatic isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates (crude MDI), as well as mixtures of crude MDI and toluene diisocyanates. The organic di- and polyisocyanates can be used individually or in the form of mixtures. Particularly preferred for the production of rigid foams is crude MDI containing about 50 to 70 weight percent polyphenyl-polymethylene polyisocyanate and from 30 to 50 weight percent diphenylmethane diisocyanate.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 29 to 3.5 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

To produce the cellular urethane-containing plastics, the organic polyisocyanate, the polyols, and, if used, the chain extender and/or crosslinking agents are reacted in such amounts that the ratio between the number of equivalents of NCO groups in the polyisocyanate and the total number of reactive hydrogen atoms in the polyols and, if used, the chain extenders/crosslinkers, is from 1:0.85 to 1.25, preferably from 1:0.95 to 1.15. If the rigid foams, at least in part, contain bonded isocyanurate groups, a ratio of from 1.4 to 60:1, preferably from 1.5 to 8:1, is usually used.

The rigid foams made from polyisocyanate polyaddition products are advantageously produced by the one-shot process, for example, using reaction injection moldings or the high pressure or low pressure method, in an open or closed mold, for example, in a metallic mold, or in a pour-in-place application where the surfaces contacting the reaction mixture are a part of the finished article.

The starting components may be mixed at from 15° to 90° C., preferably at from 20° to 35° C., and introduced into the open or closed mold, if desired under super-atmospheric pressure. The mixing, as stated above, can be carried out mechanically by means of a stirrer or a stirring screw or under high pressure by the impingement injection method. The mold temperature is expediently from 20° to 110° C., preferably from 30° to 60° C., in particular from 45° to 50° C.

The foams of the invention are also suitable in the manufacture of cellular elastomers. Moldings made from cellular elastomers of this type are used in the automotive industry, for example, as headrests, external parts, e.g., rear spoilers and bumpers, and internal panelling, and as shoe soles.

The rigid foams produced by the process according to the invention and the corresponding structural foams are used, for example, in the vehicle industry—the automotive, aircraft, and shipbuilding industries—and in the furniture and sports goods industries. They are particularly suitable in the construction and refrigeration sectors, for example, as intermediate layers for sandwich elements or for foam-filling refrigerators, freezer housings, and picnic coolers.

For pour-in-place applications, the rigid foam may be poured or injected to form a sandwich structure of a first substrate/foam/second substrate or may be laminated over a substrate to form a substrate foam structure. The first and second substrate may each be independently made of the same material or of different materials, depending upon the end use. Suitable substrate materials comprise metal such as aluminum, tin, or sheet metal; wood, including composite wood; acrylonitrile-butadiene-styrene (ABS) triblock of rubber, optionally modified with styrene-butadiene diblock, styrene-ethylene/butylene-styrene triblock, optionally functionalized with maleic anhydride and/or maleic acid, polyethylene terephthalate, polycarbonate, polyacetals, rubber modified high impact polystyrene (HIPS), blends of HIPS with polyphenylene oxide, copolymers of ethylene and vinyl acetate, ethylene and acrylic acid, ethylene and vinyl alcohol, homopolymers or copolymers of ethylene and propylene such as polypropylene, high density polyethylene, high molecular weight high density polyethylene, polyvinyl chloride, nylon 66, or amorphous thermoplastic polyesters. Preferred are ABS, HIPS, polyethylene, and high density polyethylene.

The polyurethane foam may be contiguous to and bonded to the inner surfaces of the first and second substrates, or the polyurethane foam may be contiguous to a layer or lamina of synthetic material interposed between the substrates. Thus, the sequence of layers in the composite may also comprise a first substrate/polyurethane foam/layer or lamina/second substrate or first substrate/layer or lamina/polyurethane foam/layer or lamina/second substrate.

The layer or lamina of layers additionally interposed into the composite may comprise any one of the above-mentioned synthetic resins which have good elongation such as low density polyethylene or low density linear polyethylene as a stress relief layer or a material which promotes adhesion between the polyurethane foam and the first and/or second substrate of choice.

When a synthetic plastic material such as polyethylene having few or no bonding or adhesion sites is chosen as the first and/or second substrate as an alternative to an adhesion-promoting layer, it is useful to first modify the substrate surface with a corona discharge or with a flame treatment to improve adhesion to the polyurethane foam.

During the foam-in-place operation, the substrates are fixed apart in a spaced relationship to define a cavity between the first substrate and second substrate, and optionally the inner surface of at least one substrate, preferably both, treated to promote adhesion. This cavity is then filled with a liquid polyurethane system which reacts and foams in situ, bonding to the inner surfaces of the first and second substrates. In the case of a cooler container, such as a picnic cooler, a thermoformed inner liner material is inserted into the outer shell of the cooler, optionally also thermoformed, in a nested spaced relationship to define a cavity, which cavity is then filled with a foamed-in-place polyurethane foam. In many cases, it is only the polyurethane foam which holds together the outer shell and inner liner, underscoring the need for foam dimensional stability.

The polyurethane cellular products of the invention are rigid, meaning that the ratio of tensile strength to compressive strength is high, on the order of 0.5:1 or greater and has less than 10 percent elongation. The rigid polyurethane cellular products of the invention are dimensionally stable, exhibiting little or no shrinkage, even at free rise core densities of 1.6 or less. In a preferred embodiment, the rigid polyurethane cellular products of the invention tested according to ASTM D 2126-87 using core samples of density 1.8 pcf or less with dimensions of 3"×3"×1" and taken from a 10% packed boxes measuring 4"×10"×10" advantageously have the following dimensional changes at seven (7) days of exposure: at 158° F./100 percent RH no more than ±10 percent, more preferably no more than ±8 percent, most preferably less than ±5 percent; at 200° F./0.0 percent RH no more than ±7 percent, more preferably no more than ±5 percent, most preferably less than ±4 percent; at −20° F. no more than ±10 percent, more preferably no more than ±8 percent, most preferably no more than ±3 percent.

The flow characteristics of the reaction mixture comprised of the isocyanate and the polyol composition are improved over all water-blown reaction mixture. Preferably, the reaction mixture of the invention flows at least 15 percent farther, more preferably at least 20 percent farther, most preferably at least 25 percent farther than an all water blown formulation which differs from the invention with respect to polyol component, the catalyst package, or both. The reaction mixture using the polyol composition of the invention even exhibits improved flow compared to a formic acid/water co-blown polyol compositions reacted with isocyanates which differ with respect to the polyol component or the catalyst package, by at least 5% or more, in spite of the fact that formic acid greatly lowers the viscosity of polyol compositions in which it appears. When one considers that dimensionally stable low density foams (overall density of 1.6 pcf or less) are also hereby attained, the results are surprising since reduced viscosity systems do not usually yield dimensionally stable foams at low densities.

The rigid polyurethane foams are also advantageously not friable at their surface in spite of their low density and the presence of polyols having a high hydroxyl number and low equivalent weight. The foams exhibit a surface friability of less than 5 percent when tested according to ASTM C 421, at densities of 2.0 pcf or less, even at densities of 1.5 pcf or less. The low surface friability enables the foam to adhere well to substrates.

The following non-limiting experiments were performed to illustrate some of the embodiments of the invention. All amounts are in parts by weight unless otherwise stated.

| | |
|---|---|
| Polyol A | is a sucrose/propylene glycol mixed initiated polyoxypropylene polyether polyol having an equivalent weight of less than 115, a nominal OH number of about 570, and a viscosity of about 1,430,000 cP at 25° C., commercially available from BASF Corporation as Pluracol ® Polyol 240. |
| Polyol B | is a 35/65 weight percent mixture of dipropylene glycol/sucrose initiated polyoxypropylene polyether polyols having an average functionality of greater than 3.9, an equivalent weight of greater than 140, and a viscosity of about 2100 at 25° C., commercially available from BASF Corporation as Pluracol ® Polyol 1174. |
| Polyol C | is a vicinal toluenediamine initiated polyoxyethylene polyoxypropylene polyether polyol having a functionality of greater than 3.5, an equivalent weight of greater than 130 commercially available from BASF Corporation as Pluracol ® Polyol 824. |
| Polyol D | is a propylene glycol initiated polyoxypropylene polyether polyol having a functionality of about 2, and a viscosity of about 73 at 25° C. |
| Polyol E | is a propylene glycol initiated polyoxypropylene polyether polyol having a functionality of about 2 and a viscosity of about 150 cP at 25° C. |
| Polyol F | is a sorbitol initiated polyoxypropylene polyether polyol having an OH number of 490, a functionality of about 5.4, an equivalent weight of about 115, and a viscosity of about 4,500 cP at 25° C., commercially available from Rhone Poulenc as ALKAPOL SOR-490. |
| Polyol G | is a monoethanolamine initiated propylene oxide ethylene oxide adduct and having a viscosity of about 500 cP at 25° C., an equivalent weight of less than 130, and a nominal OH of about 500 commercially available from BASF Corporation as Pluracol ® Polyol 1016. |
| Iso A | is a solvent-free polymethylene polyphenylene polyisocyanate with a functionality of about 2.7, commercially available from BASF Corporation as LUPRANATE ® M2OS Iso. |
| Catalyst A | is DABCO BL-17, commercially available from Air Products and Chemical Co., and is a formic acid blocked N,N,N',N'-tetramethyl-2,2'-diaminodiethyl ether acting as a delayed action blowing catalyst. |
| Catalyst B | is N,N,N',N'-tetramethyl-n-hexyl diamine acting as a delayed action gel catalyst, commercially available from BASF Corporation or Allied Signal. |
| Catalyst C | is dibutyltin dimercaptide, commercially available from Witco Corp. as Fomrez UL-1. |
| Catalyst D | is 100 percent bis(N,N-dimethylaminoethyl)ether, the same as Catalyst A, except that it is not formic acid blocked and is pure, commercially available from Air Products and Chemical Co. |
| Catalyst E | is pentamethyl-diethylene triamine marketed as Polycat 5 available from Air Products and Chemical Co. |
| Surfactant A | is L-6900, a silicone surfactant commercially available from Union Carbide. |

EXAMPLE 1

Polyols A, B, C, D, and E, Surfactant A, Catalysts A, B, and C were all thoroughly mixed together, along with formic acid and water, in the proportions stated below in Table 1 to form a polyol composition. The Iso A and the polyol composition were loaded into tanks kept at room temperature and attached to a high pressure impingement mixing machine. The machine was pressurized to about 2,000 p.s.i. on the resin and iso sides with shot times of 2.8 seconds for samples 1–3 and 2.7 seconds for samples 4–6. The polyurethane mixture for each sample was poured once into a #10 Lily cup, a 4"×10"×10" cake box, and a 4"×10"×10" cake box overpacked by a theoretical amount of ten (10) percent, to determine the free rise densities of the former two and the overall and core densities of the packed box. Other physical properties, including dimensional stability, of each packed box sampled in Table I were tested according to the following ASTM standards and reported in Table II.

| Test | ASTM |
|---|---|
| Compressive Strength | D 1621 |
| Thermal Conductivity | C 518 |
| Friability | C 421 |
| Porosity | D 2856 |
| Dimensional Stability | D 2126 |

TABLE 1

| | SAMPLES | | | | | |
|---|---|---|---|---|---|---|
| | 1 | 2 | 3 | 4 | 5 | 6 |
| POLYOL A | 10 | 10 | 10 | — | — | — |
| POLYOL B | 10 | 10 | 10 | — | — | — |
| POLYOL C | 50 | 50 | 50 | 30 | 30 | 30 |
| POLYOL D | 15 | 15 | 15 | 20 | 20 | 20 |
| POLYOL E | 15 | 15 | 15 | 20 | 20 | 20 |
| POLYOL F | — | — | — | 30 | 30 | 30 |
| CATALYST A | 1.5 | 1.5 | 1.5 | 1.5 | 1.5 | 1.5 |
| CATALYST B | 1 | 1 | 1 | 1 | 1 | 1 |
| CATALYST C | 0.1 | 0.1 | 0.1 | 0.1 | 0.1 | 0.1 |
| SURFACTANT A | 1.5 | 1.5 | 1.5 | 1.5 | 1.5 | 1.5 |
| FORMIC ACID[a] | 7 | 7 | 8 | 6 | 7 | 7 |
| WATER | 2 | 3 | 3 | 2 | 2 | 3 |
| TOTAL | 113.1 | 114.1 | 115.1 | 112.1 | 113.1 | 114.1 |
| REACTIVITY IN #10 LILY CUP | | | | | | |
| FREE RISE SHOT (s) | 2.8 | 2.8 | 2.8 | 2.7 | 2.7 | 2.7 |
| CREAM | 2.0 | 2.1 | 2.2 | 2.3 | 2.2 | 2.6 |
| GEL | 25 | 23 | 22 | 25 | 24 | 26 |
| RISE | 45 | 59 | 68 | 59 | 56 | 63 |
| TACK FREE | 43 | 40 | 38 | 40 | 36 | 44 |
| P.C.F. | 1.30 | 1.22 | 1.16 | 1.28 | 1.23 | 1.20 |
| BOX, FREE RISE SHOT (s) | 3.0 | 3.0 | 3.0 | 3.0 | 2.8 | 2.8 |
| HT. | 10" | 10" | 10" | 10" | 10" | 10" |
| WT. | 150.1 | 140.7 | 136.3 | 152.9 | 143.4 | 142.9 |
| P.C.F. | 1.43 | 1.34 | 1.30 | 1.45 | 1.36 | 1.36 |
| SHRINKAGE | NONE | NONE | NONE | NONE | NONE | NONE |
| SURFACE FRIABILITY | NONE | NONE | NONE | NONE | NONE | NONE |
| CARDBOARD FRIABILITY | NONE | NONE | NONE | NONE | NONE | NONE |
| ADHESION | GOOD | GOOD | GOOD | GOOD | GOOD | GOOD |
| MIXING | FAIR | FAIR | GOOD | GOOD | GOOD | GOOD |
| 10% PACKED PANELS | | | | | | |
| SHOT (s) | 2.3 | 2.29 | 2.24 | 2.35 | 2.21 | 2.22 |
| WT (g) | 165.0 | 156.0 | 152.5 | 168.4 | 159.0 | 157.5 |
| ACTUAL PCF (overall) | 1.57 | 1.48 | 1.45 | 1.60 | 1.51 | 1.50 |
| ACTUAL PCF (core) | 1.44 | 1.42 | 1.34 | 1.53 | 1.44 | 1.37 |
| PCF OVERALL (theor.) | 1.57 | 1.47 | 1.43 | 1.60 | 1.50 | 1.50 |

TABLE 2

| | SAMPLES | | | | | |
|---|---|---|---|---|---|---|
| | 1 | 2 | 3 | 4 | 5 | 6 |
| DENSITY ACTUAL | | | | | | |
| OVERALL | 1.57 | 1.48 | 1.45 | 1.60 | 1.51 | 1.50 |
| CORE | 1.44 | 1.42 | 1.34 | 1.53 | 1.44 | 1.37 |
| COMPRESSIVE STRENGTH | | | | | | |
| YIELD PT.-PARR. | 16.4 | 17.2 | 15.9 | 17.2 | 15.6 | 17.5 |
| % DEFL. @ YIELD | 5.1 | 11.2 | 9.0 | 5.6 | 5.3 | 8.9 |
| 10% DEFLECTION | 16.0 | 17.2 | 15.9 | 17.7 | 16.1 | 17.4 |

TABLE 2-continued

|  | SAMPLES | | | | | |
| --- | --- | --- | --- | --- | --- | --- |
|  | 1 | 2 | 3 | 4 | 5 | 6 |
| MODULUS | 411 | 406 | 371 | 414 | 393 | 423 |
| 10% DEFLECTION | 3.8 | 7.3 | 6.8 | 6.9 | 6.7 | 6.7 |
| MODULUS | 41 | 95 | 95 | 124 | 106 | 105 |
| K-FACTOR |  |  |  |  |  |  |
| INITIAL | .185 | .209 | .224 | 0.187 | 0.222 | 0.214 |
| TEN (10) DAYS | — | — | — | 0.217 | 0.225 | 0.219 |
| FRIABILITY | 1.92 | 1.28 | 2.88 | 1.3 | 0.7 | 0.7 |
| POROSITY | — | — | — | 94.2 | 87.8 | 69.5 |
| DIMENS. STABILITY SEC |  |  |  |  |  |  |
| 150 F./100% RH |  |  |  |  |  |  |
| ONE (1) DAY | −12.9 | 0.0 | −0.2 | −16.7 | 5.2 | 3.2 |
| TWO (2) DAYS | −13.6 | 0.2 | 0.1 | −21.2 | 5.0 | 3.3 |
| SEVEN (7) DAYS | −14.7 | 1.4 | 1.9 | −17.4 | 7.3 | 4.3 |
| 200 F./0% RH |  |  |  |  |  |  |
| ONE (1) DAY | −2.8 | −0.9 | −0.2 | −23.3 | −8.3 | 0.4 |
| TWO (2) DAYS | −7.0 | −1.4 | −0.5 | −24.1 | −8.3 | 0.8 |
| SEVEN (7) DAYS | −4.6 | −0.0 | 1.2 | −18.1 | 3.3 | 1.4 |
| −20 F. |  |  |  |  |  |  |
| ONE (1) DAY | −8.3 | 0.5 | −0.3 | −12.7 | −8.0 | −0.8 |
| TWO (2) DAYS | −9.1 | 0.8 | −0.4 | −12.5 | −9.0 | −1.1 |
| SEVEN (7) DAYS | −7.5 | 2.4 | 1.5 | −11.2 | −7.0 | −1.5 |

The results in Table 2 indicate that rigid polyurethane foams having overall packed densities of about 1.6 or below, whether open or closed celled, possess good dimensional stability at low overall packed densities of 1.6 pcf or less, especially the rigid foams of samples 2–3 and 5–6. It is not known why the foams of samples 1 and 4 did not exhibit dimensional stabilities as good as the other samples. The numerical proximity between the overall and core densities is an indicator of good flow.

EXAMPLE II

The foam ingredients for comparative samples 7–8 listed on Table 3 below were machine mixed at the stated calibrations, and shot initially to determine their reactivities.

TABLE 3

|  | SAMPLE | |
| --- | --- | --- |
|  | 7 | 8 |
| POLYOL G | 25 | 25 |
| POLYOL C | 75 | 75 |
| SURFACTANT A | 1.5 | 1.5 |
| CATALYST E | 2.5 | 2.5 |
| FORMIC ACID | — | 7.0 |
| WATER | 7.0 | 3.0 |
| TOTAL | 111.0 | 114.0 |
| INDEX | 220.30 | 201.97 |
| ISO A |  |  |
| REACTIVITY |  |  |
| SHOT TIME | 3.0 | 3.0 |
| CREAM | 5.5 | 3.2 |
| GEL | 28 | 23 |
| RISE | 37 | 37 |
| TACK FREE | 58 | 47 |

TABLE 3-continued

|  | SAMPLE | |
| --- | --- | --- |
|  | 7 | 8 |
| #10 LILY CUP, PCF | 1.57 | 1.29 |
| CALIBRATION |  |  |
| RESIN | 63.1 | 72.1 |
| ISO | 129.0 | 126.8 |
| RPM, RESIN | 438 | 494 |
| RPM, ISO | 750 | 750 |
| PRESSURE, RESIN | 2100 | 2000 |
| PRESSURE, ISO. | 2000 | 2000 |
| RATIO RESIN/100 I ACTUAL | 0.49 | 0.57 |
| RATIO RESIN/100 I | 0.50 | 0.56 |
| THEORETICAL |  |  |
| VISCOSITY, CPS. | 1850 CPS @ 24.8 | 3110 CPS @ 24.8C |

One day after standing in the #10 Lily cup, the foams in each comparative sample pulled away from the sides of the cup after sitting overnight at ambient conditions, indicating that the foams would experience extreme shrinkages under humid, hot, or cold conditions. The foams were also extremely friable as indicated by their crunchiness and inability to stick to the sides of the cardboard cup.

EXAMPLE III

The foam formulations of samples 1–6 were tested for flowability and compared against comparative foam formulations which either had no formic acid present and/or contained the wrong catalyst/polyol component. The flow of samples 1–8 were tested by pouring the machine mixed reaction mixture ingredients into a tube at the stated shot times and shot weights in TABLE 4 below and at machine pressures of about 2000 p.s.i. on the resin and iso sides. The length of the resulting foam in the tube was measured in centimeters.

TABLE 4

| | SAMPLE | | | | | | | |
|---|---|---|---|---|---|---|---|---|
| | 1 | 2 | 3 | 4 | 5 | 6 | 7 | 8 |
| SHOT TIME (s) | 1.25 | 1.28 | 1.3 | 1.28 | 1.28 | 1.32 | 1.35 | 1.3 |
| SHOT WEIGHT (g) | 101.5 | 98.6 | 98.5 | 102.8 | 101.7 | 100.4 | 95.5 | 96.2 |
| FOAM LENGTH (cm) | 180 | 182 | 190 | 187 | 195 | 187 | 140 | 163 |

The flow results of samples 1–6 show a marked improvement in flow over the all water blown sample 7, by at least 22% to about 28%. The all water blown sample 7 is a typical water blown system and does not contain either the catalyst or the polyol component as described above, nor does it contain formic acid. Formic acid will help the flow of the reaction mixture as shown by sample 8 which flowed 23 more centimeters for a 14% improvement. However, without the proper polyol component and catalyst, the flow of reaction mixture sample 8 even with formic acid was at least 11% less than samples 1–6. Thus, the flowability of the above formulations 1–6 made according to the invention herein are significantly improved over other formulations which differ in polyols, catalysts, or blowing agent.

EXAMPLE IV

The following experiment was conducted to ascertain the exotherm generated by different foam samples over time. Series 1 and 2 contained different amounts of formic acid in the same proportion to water. Series 3 is an all water-blown formulation. The polyol composition and the isocyanate were added together in a #10 Lily cup and stirred for 3 seconds at 1720 rpm using a Jiffy mix blade. A Wahl Heat-Probe thermometer, Platinum 360X Serial No. P8198 probe was inserted through the cup at about the midsection to measure the heat generated during the foaming reaction. The formulations are reported in Table 5, and the results are graphed in FIG. 1.

TABLE 5

| SERIES | 1 | 2 | 3 |
|---|---|---|---|
| POLYOL C | 30 | 30 | 30 |
| POLYOL D | 20 | 20 | 20 |
| POLYOL E | 20 | 20 | 20 |
| POLYOL F | 30 | 30 | 30 |
| CATALYST A | 1.5 | 1.5 | — |
| CATALYST B | 1.0 | 1.0 | 0.6 |
| CATALYST C | 0.1 | 0.1 | 0.1 |
| CATALYST D | — | — | 0.6 |
| SURFACTANT A | 1.5 | 1.5 | 1.5 |
| FORMIC ACID(a) | 7.0 | 5.6 | — |
| WATER | 3.0 | 1.6 | 7.0 |
| TOTAL | 114.10 | 113.3 | 109.8 |
| ISO A | 184.03 | 151.82 | 201.77 |
| INDEX | 1.1 | 1.1 | 1.1 |

A discussion on the lower exotherm produced in a formic acid formulation appears above. The formulations abouve also indicate that adding formic acid to the polyol composition reduces the amount of isocyanate required to achieve an index equivalent to an all water-blown formulation. The amount of isocyanate required to react with the polyol composition of the invention containing formic acid is advantageously 5 percent to 30 percent, more preferably 7 percent to 25 percent less than the amount of isocyanate required to react with polyol compositions containing solely water as the blowing agent at an equivalent index for the manufacture of rigid polyurethane foams having free rise densities of less than 1.6.

What we claim is:

1. A dimensionally stable, rigid polyurethane foam having a core density of 1.0 to 1.8 pcf comprising the reaction product of:

a) an organic polyisocyanate and b) a polyol composition and, optionally, c) a chain extender and/or a crosslinking agent in the presence of d) a blowing agent and e) a catalyst and, optionally, f) assistants and/or additives, said polyol composition comprising (1) a polyoxyalkylene polyether polyol having an equivalent weight of 130 or less, and an average functionality of 3.1 or greater; (2) a polyoxyalkylene polyether polyol having an average functionality of 1.8 to less than 3.1, a viscosity of 800 cP or less at 25° C., and an equivalent weight within the range of from greater than 130 to 1500; and (3) a polyoxyalkylene polyether polyol having an average functionality of greater than 3.1 and an equivalent weight of greater than 130, said blowing agent comprising a mixture of formic acid and water, wherein said rigid polyurethane foam being dimensionally stable according to the ASTM D 2126-87 test method by exhibiting a volume change of ±10 percent or less at 158° F. and 100 percent relative humidity, of ±7 percent or less at 200° F. and 0.0 percent relative humidity, and of ±10 percent or less at −20° F. and 0.0 percent relative humidity, and exhibiting a surface friability of less than 5% according to the ASTM C 421 test method.

2. A rigid polyurethane foam as recited in claim 1, wherein the amount of formic acid is greater than 5 pbw based on 100 pbw of the polyol composition, and said catalyst comprising a tertiary amine gel catalyst fully blocked with an organic acid and a tertiary amine blowing catalyst fully blocked with an organic acid.

3. A rigid polyurethane foam as recited in claim 2, wherein the core density is from 1.1 pcf to 1.6 pcf, having a volume change of no more than ±8 percent at 158° F. and 100 percent relative humidity, no more than ±5 percent at 200° F. at 0.0 percent relative humidity, and no more than ±8 percent at −20° F. and 0.0 percent relative humidity.

4. A rigid polyurethane foam as recited in claim 3, wherein the volume changes are no more than ±5 percent, less than ±4 percent, and no more than ±3 percent, respectively.

5. A dimensionally stable, rigid polyurethane foam having a core density of 1.0 to 1.8 pcf comprising the reaction product of:

a) an organic polyisocyanate and b) a polyol composition and, optionally, c) a chain extender and/or a crosslinking agent in the presence of d) a blowing agent and e) a catalyst and, optionally, f) assistants and/or additives, said polyol composition comprising (1) a polyoxyalkylene polyether polyol having an equivalent weight of 130 or less, and an average functionality of 3.1 or greater; (2) a polyoxyalkylene polyether polyol having an average functionality of 1.8 to less than 3.1, a viscosity of 800 cP or less at 25° C., and an equivalent weight within the range of from greater than 130 to 1500; and (3) a polyoxyalkylene polyether polyol having an average functionality of greater than 3.1 and an equivalent weight of greater than 130, wherein said rigid polyurethane foam being dimensionally stable according to the ASTM D 2126-87 test method by exhibiting a volume change of ±10 percent or less at 158° F. and 100 percent relative humidity, of ±7 percent or less at 200° F. and 0.0 percent relative humidity, and of ±10 percent or less at −20° F. and 0.0 percent relative humidity, and exhibiting a surface friability of less than 5% according to the ASTM C 421 test method.

6. A rigid polyurethane foam as recited in claim 5, wherein polyol (1) has an equivalent weight of 120 or less, an average functionality of 4 or more, and a hydroxyl number of 450 or more; polyol (2) has an average functionality of 1.8 to 3 and a viscosity of 550 cP at 25° C. or less; and polyol (3) has an average functionality of 3.5 or greater and an equivalent weight of 140 or more.

7. A rigid polyurethane foam as recited in claim 5, wherein polyol (1) has an equivalent weight of 115 or less, an average functionality of 4.5 or more, and a hydroxy number of 480 ore more; and polyol (3) has an average functionality of 3.9 or greater.

8. A rigid polyurethane foam as recited in claim 5, wherein the polyol (3) has a viscosity of 5000 cP or less at 25° C.

9. A rigid polyurethane foam as recited in claim 5, wherein the polyol (3) has a viscosity of 3000 cP or less at 25° C.

10. A rigid polyurethane foam as recited in claim 5, wherein the amount of polyol (1) ranges from 10 weight percent to 50 weight percent; the amount of polyol (2) ranges from 20 weight percent to 60 weight percent; and the amount of polyol (3) ranges from 20 weight percent to 75 weight percent, based on the weight of the polyol composition.

11. A rigid polyurethane foam as recited in claim 5, wherein the amount by weight of polyol (2) is greater than the amount by weight of polyol (1) based on the weight of the polyol composition.

12. A rigid polyurethane foam as recited in claim 5, wherein the amount of polyol (1) is from 20 weight percent to 40 weight percent; polyol (2) is from 25 weight percent to 45 weight percent; and polyol (3) is from 20 weight percent to 40 weight percent, based on the weight of the polyol composition.

13. A rigid polyurethane foam as recited in claim 5, wherein the polyol component further contains polyester polyols, polyether polyester polyols, or polymer modified polyether polyols.

14. A rigid polyurethane foam as recited in claim 5, wherein the catalyst comprises a tertiary amine blow catalyst blocked with an organic carboxylic acid, and a delayed action tertiary amine gel catalyst.

15. A dimensionally stable, rigid polyurethane foam having a core density of 1.0 to 1.8 pcf comprising the reaction product of:

a) an organic polyisocyanate and
   b) a polyol composition and, optionally,
   c) a chain extender and/or a crosslinking agent
in the presence of
   d) a blowing agent and
   e) a catalyst and, optionally,
   f) assistants and/or additives, said polyol composition comprising (1) a polyoxyalkylene polyether polyol having an equivalent weight of 130 or less, and an average functionality of 3.1 or greater; (2) a polyoxyalkylene polyether polyol having an average functionality of 1.8 to less than 3.1, a viscosity of 800 cP or less at 25° C., and an equivalent weight within the range of from greater than 130 to 1500; and (3) a polyoxyalkylene polyether polyol having an average functionality of greater than 3.1 and an equivalent weight of greater than 130; said catalyst comprising a tertiary amine blow catalyst blocked with an organic carboxylic acid, and a delayed action tertiary amine gel catalyst, wherein said rigid polyurethane foam being dimensionally stable according to the ASTM D 2126-87 test method by exhibiting a volume change of ±10 percent or less at 158° F. and 100 percent relative humidity, of ±7 percent or less at 200° F. and 0.0 percent relative humidity, and of ±10 percent or less at −20° F. and 0.0 percent relative humidity, and exhibiting a surface friability of less than 5% according to the ASTM C 421 test method.

16. A rigid polyurethane foam as recited in claim 15, wherein the blowing agent comprises a mixture of water and formic acid.

17. A rigid polyurethane foam as recited in claim 15, wherein the combined amount of organic acid blocked tertiary amine blow catalyst and the delayed action gel catalyst are present in the polyol composition in an amount ranging from 2.0 pbw to 4.0 pbw based on 100 pbw of the polyol composition.

18. A rigid polyurethane foam as recited in claim 15, wherein the blow catalyst is a formic acid blocked tertiary amine ether.

19. A rigid polyurethane foam as recited in claim 15, wherein the tertiary amine of the blow catalyst comprises N,N,N',N'-tetramethyl-2,2'-diaminoethyl ether, N,N,N'N", N'''-pentamethyl diethylene triamine, or N,N,N',N",N"-pentamethyldipropylene triamine; and the delayed action gel catalyst comprises N,N,N',N'-tetramethyl hexamethylene diamine, or an organic acid blocked dimethyl cyclohexylamine, an organic acid blocked triethylenediamine, an organic acid blocked N-methyl morpholine, an organic acid blocked N-ethyl morpholine, an organic acid blocked dimethylbeizylamine, or an organic acid blocked tetramethylethylene diamine.

* * * * *